Dec. 5, 1967   D. S. ORR   3,356,224
TRAVELLING BELT TYPE DRUM FILTER
Filed Dec. 3, 1964   5 Sheets-Sheet 1

INVENTOR.
DUNDAS S. ORR
BY Theodore M. Jablon
ATTORNEY.

Dec. 5, 1967  D. S. ORR  3,356,224
TRAVELLING BELT TYPE DRUM FILTER
Filed Dec. 3, 1964  5 Sheets-Sheet 2
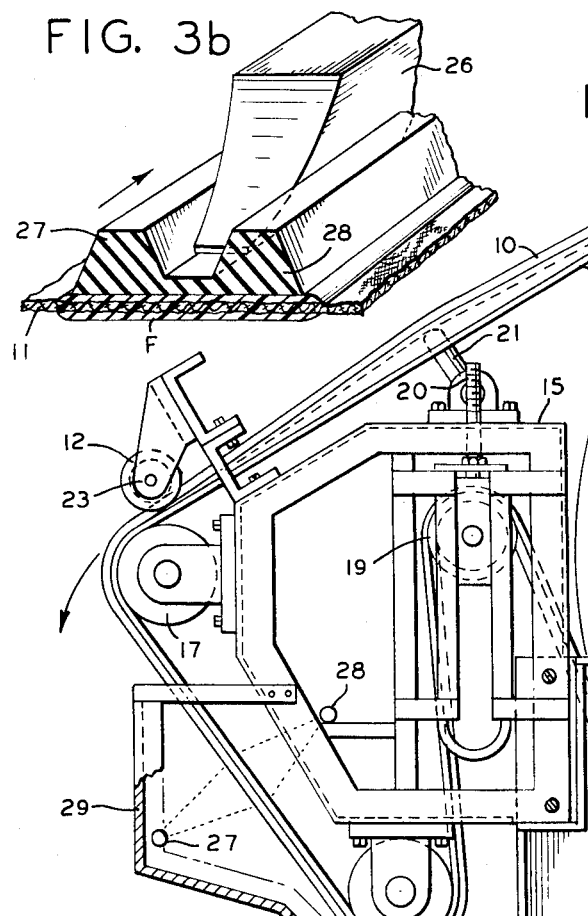
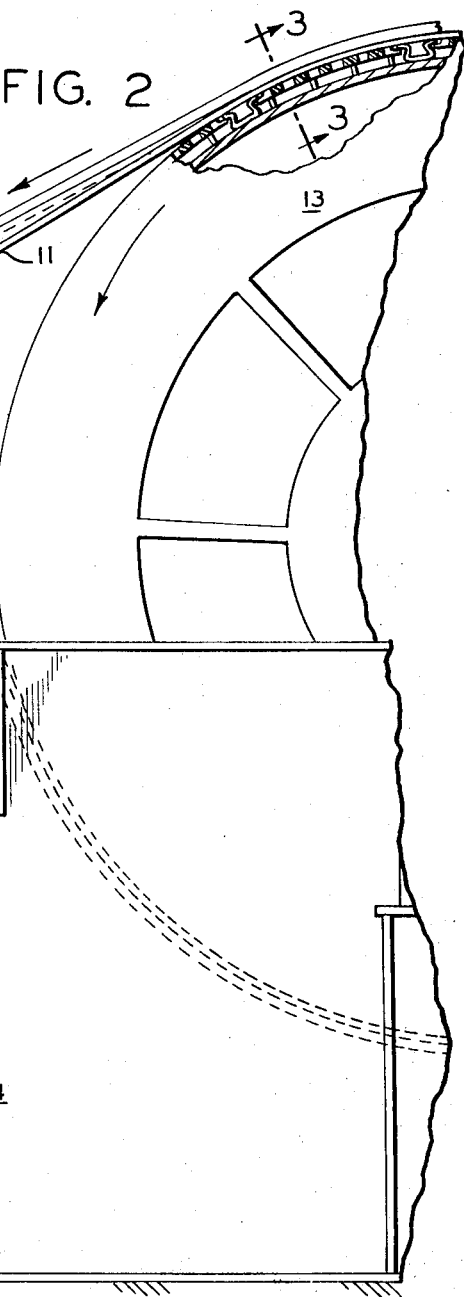
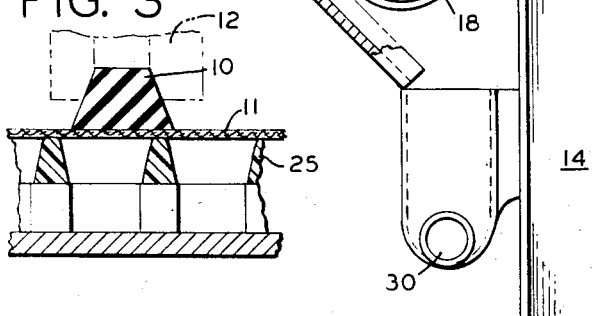
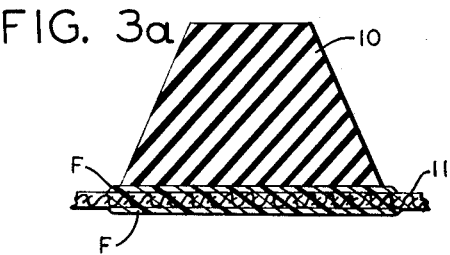
INVENTOR.
DUNDAS S. ORR
BY Theodore M. Jablon
ATTORNEY.

Dec. 5, 1967   D. S. ORR   3,356,224
TRAVELLING BELT TYPE DRUM FILTER
Filed Dec. 3, 1964   5 Sheets-Sheet 3

INVENTOR.
DUNDAS S. ORR
BY *Teodore M. Jablon*
ATTORNEY.

Dec. 5, 1967     D. S. ORR     3,356,224
TRAVELLING BELT TYPE DRUM FILTER
Filed Dec. 3, 1964     5 Sheets-Sheet 4
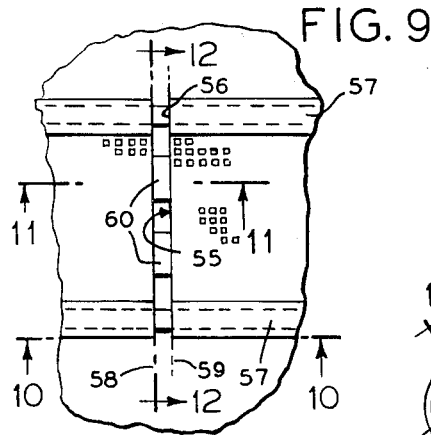
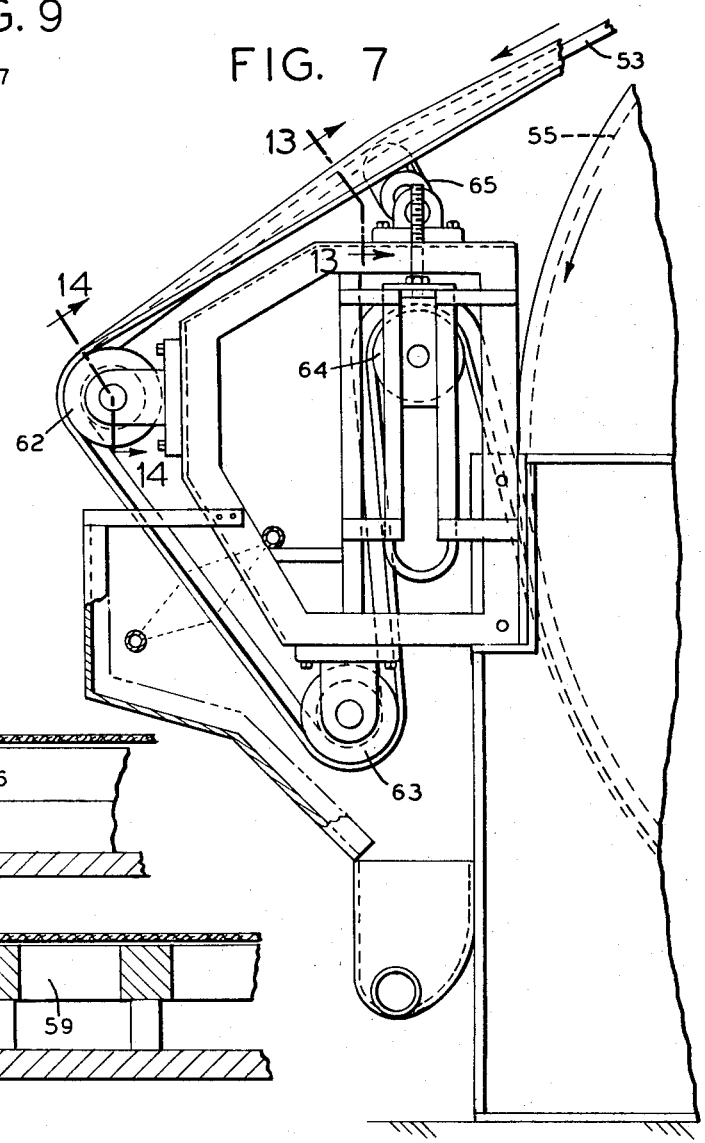
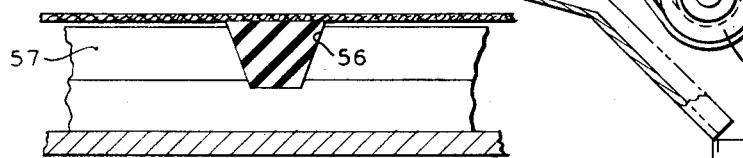
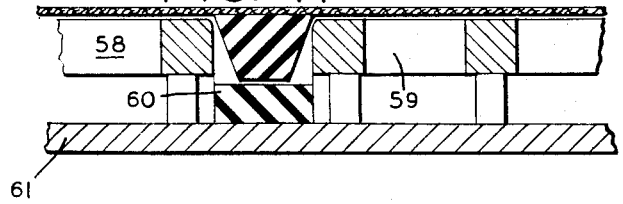
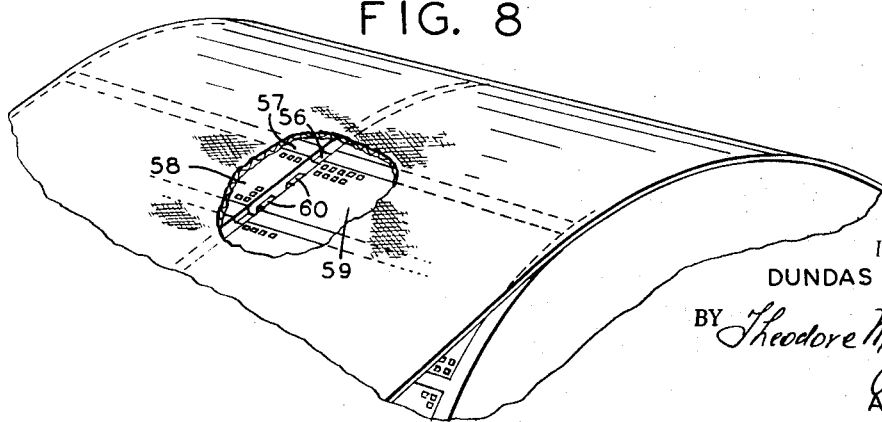
INVENTOR.
DUNDAS S. ORR
BY Theodore M. Jablon
ATTORNEY.

Dec. 5, 1967  D. S. ORR  3,356,224
TRAVELLING BELT TYPE DRUM FILTER
Filed Dec. 3, 1964  5 Sheets-Sheet 5
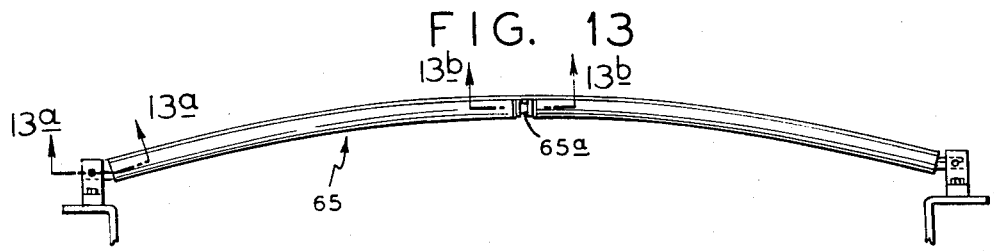
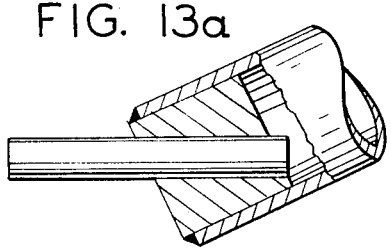
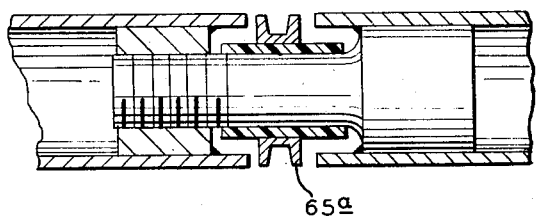
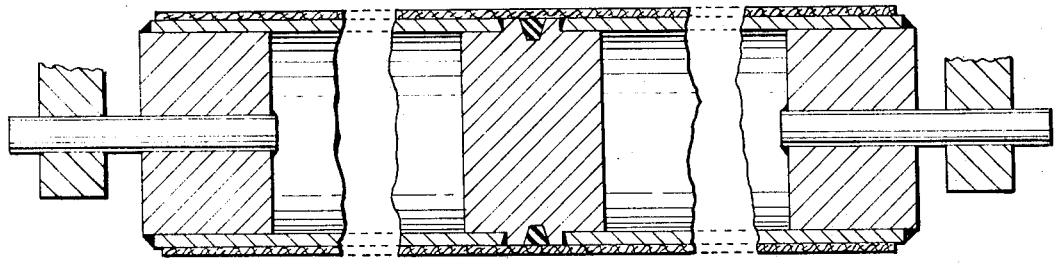
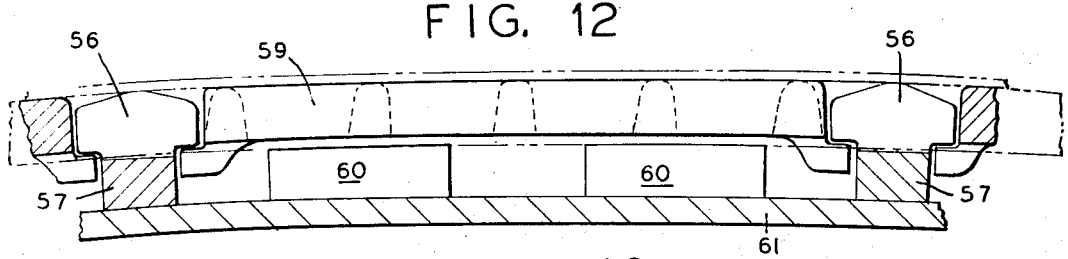
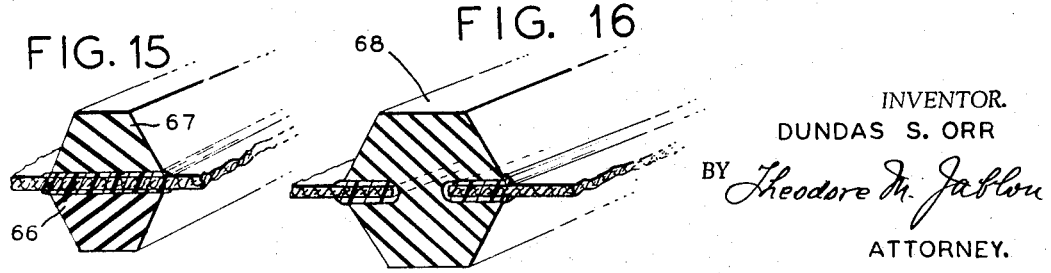
INVENTOR.
DUNDAS S. ORR
BY *Theodore M. Jablon*
ATTORNEY.

United States Patent Office 3,356,224
Patented Dec. 5, 1967

3,356,224
TRAVELLING BELT TYPE DRUM FILTER
Dundas S. Orr, Stamford, Conn., assignor to Dorr-Oliver Incorporated, Stamford, Conn., a corporation of Delaware
Filed Dec. 3, 1964, Ser. No. 415,767
8 Claims. (Cl. 210—401)

ABSTRACT OF THE DISCLOSURE

A rotary vacuum drum filter apparatus of the travelling filter belt type, provided with belt tracking means featuring a median tracking rib provided externally on the belt and engaged by a stationary guide member or roller associated with the cake discharge roll, combined with a transverse bowed anti-wrinkling member, and a return roller having a groove for the tracking rib.

---

This invention relates to rotary drum filters, and more particularly to improvements on drum filters of the type that is equipped with an endless travelling filter belt.

In this travelling belt type filter unit a horizontal filter drum is mounted on a support structure with drive means for rotating the drum through a filtration cycle, with the lower portion of the drum immersed in a bath of slurry. An endless travelling filter belt of porous filter material surrounds and engages a major portion of the circumference of the drum so that the belt is moved by the rotation of the drum, the filter being effective to collect and hold a layer or cake of slurry solids from the bath to be discharged from the filter belt in the course of the filtration cycle. Auxiliary devices are provided for guiding the filter belt away from the upper portion of the drum to effect discharge of the cake material from the belt and then back onto the lower portion of the drum where the layer of solids is collected from the bath. A spray washing device washes the filter material free of residual particles in a zone located between the cake discharge and the drum.

An object of the invention is to maintain the travelling filter belt in alignment against a tendency towards lateral shifting or displacement of the belt relative to the filter drum, and to provide simple and effective compensating means therefor.

Another object is to provide tracking means for the filter belt, that are simple and effective.

Another object is to provide tracking means that are readily accessible and can be readily observed in operation.

Still another object is to provide belt tracking devices that are readily applicable to standard or existing belt type drum filters.

To this end, the invention provides means for tracking the travelling filter belt substantially along the median line thereof.

This is accomplished by providing the filter belt with track means comprising, for example, a track element or rib or ridge which may extend substantially along the median line of the filter belt, and guide means engaging the track element in such a manner as to counteract a tendency towards lateral displacement of the filter belt relative to the filter drum during its rotation.

The invention also provides means for counteracting or correcting a tendency of the central portion of the filter belt to creep longitudinally relative to the edge portions of the belt.

Features of the invention lie in various arrangements and details of the belt tracking means of the filter unit, the means for correcting the creeping of the central portions of the filter belt, and in the arrangement of the auxiliary devices which guide the filter belt away from, and back onto the drum.

Other features and advantages will hereinafter appear.

As this invention may be embodied in several forms without departing from the spirit or essential characteristics thereof, the present embodiment is therefore illustrative and not restrictive, since the scope of the invention is defined by the appended claims, rather than by the description preceding them, and all changes that fall within the metes and bounds of the claims, or of forms that are their functional as well as conjointly cooperative equivalents, are therefore intended to be embraced by those claims.

FIGURE 2 is a fragmentary side view of the filter unit of FIGURE 1;

FIGURE 3 is a greatly enlarged cross-sectional detail view taken on line 3—3 in FIGURE 2, showing the external median tracking element on the filter belt with associated parts of the filter drum;

FIGURE 3a is a further enlarged cross-sectional detail view of the linear tracking element, with flexible bonding material connecting it to the filter belt material;

FIGURE 3b shows another form of the tracking means;

FIGURE 7 is a fragmentary side view of the belt filter unit showing internally arranged tracking means for the filter belt;

FIGURE 8 is a fragmentary perspective view of the filter drum and filter belt thereon with a portion of the belt broken away to expose the internal tracking arrangement for the belt;

FIGURE 9 is an enlarged view of the exposed portion in FIGURE 8;

FIGURE 10 is a sectional view taken on line 10—10 in FIGURE 9;

FIGURE 11 is a sectional view taken on line 11—11 in FIGURE 9;

FIGURE 12 is a sectional view taken on line 12—12 of FIGURE 9;

FIGURE 13 is a sectional detail view of the bowed guide element taken on line 13—13 of FIGURE 7;

FIGURE 13a is a sectional detail view taken on line 13a—13a of FIGURE 13;

FIGURE 13b is a sectional detail view taken on line 13b—13b of FIGURE 13;

FIGURE 14 is a sectional detail view of a guide roller taken on line 14—14 in FIGURE 7;

FIGURES 15 and 16 are detail cross-sectional views of the center portion of the filter belt showing different forms of the linear tracking element.

Figure 1:
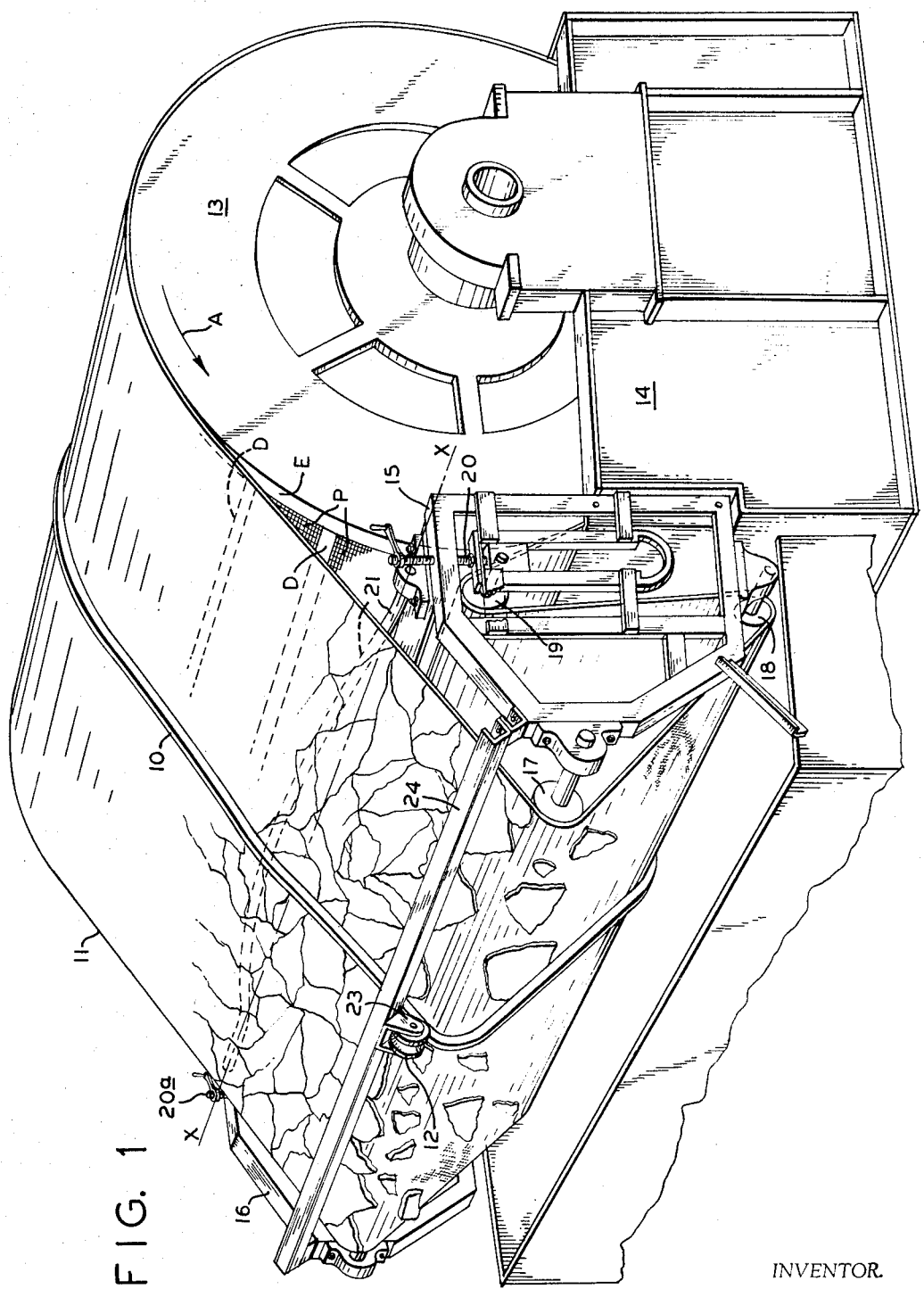
FIGURE 1 is a perspective view of the belt filter unit embodying one form of the invention comprising externally arranged filter belt tracking means and a guide roll arrangement including a bowed guide element.

In the travelling belt filter unit of FIG. 1 according to one form of the invention, the belt tracking means comprise a linear tracking element 10 provided externally upon a porous filter belt 11, and extending substantially along the median line of the belt. The filter belt may consist, for example, of suitable woven filter cloth. This linear tracking element 10 cooperates with or is engaged by a tracking roller 12 in a manner to counteract or prevent laterally directed shifting or wandering of the filter belt during filter operation.

The porous filter belt surrounds and frictionally engages the major portion of the circumference of a filter drum 13 mounted for rotation in the direction of arrow "A" upon a supporting structure, for example a slurry tank 14 containing a bath of slurry to be filtered and into which bath the lower portion of the drum is immersed. The filter drum may be of the conventional vacuum suction type that is a drum equipped with conventional filtration panels P arranged side by side around the periphery of the drum. These individual filter panels or vacuum chambers are defined from each other by division strips D flush with the peripheral edge portions E of the filter drum. The operation of such a vacuum filter drum in a conventional filtration cycle is of itself well known, the filter operating cycle being controllable by the usual trunnion valve here not shown.

The filter belt is moved by the rotation of the drum and will continuously collect and hold a layer of cake slurry solids from the bath, which cake is then continuously removed from the filter belt at a separate cake discharge station in the course of the filtration cycle.

Accordingly, this filter unit is provided with a guide roll system or auxiliary devices which comprise guide rolls mounted in a pair of lateral supporting frames or bracket structures 15 and 16, respectively, rigidly connected to the slurry tank for guiding the filter belt away from the upper portion of the drum to effect the discharge of the cake material from the belt, and then back onto the lower portion of the drum where the layer of solids is collected from the bath.

The guide roll system in the embodiment of FIGS. 1 and 2 comprises three rolls, namely a first or cake discharge roll 17, a second or idler roll 18, and a third or tension roll 19. Each end of the tension roll is vertically adjustable to correct the tension individually for each side edge portion of the filter cloth by means of well known screw spindle operated adjusting devices 20 and 20a respectively which include self-adjusting bearings for the roll.

This guide roll system further comprises a bowed guide element 21 mounted atop the respective bracket structures 15 and 16 so as to engage the underside or inner surface of the filter belt in a manner and for a purpose furthermore to be described. May it suffice at this point to say that this bowed guide element is adjustable and imparts to the filter belt an outwardly convex transverse bulge, this bowed element being moreover adjustable about a horizontal axis X—X for controlling the extent of this bulge in order to effect certain corrections in the operation of the filter belt furthermore to be described.

The tracking roller 12 has a peripheral groove substantially conforming to the profile of the linear tracking element. The movement of the filter belt rotates the tracking roller upon a horizontal axle supported in bearing means 23 mounted on a transverse beam 24 the ends of which are fastened upon the respective side frames 15 and 16. This tracking roller being confined against displacement in either axial direction, will hold the tracking element and with it the filter belt on a desired centered course relative to the ends of the drum. Preferably, to obtain this tracking effect in the present embodiment herein illustrating the invention, the tracking roller is located fairly close to the cake discharge roll, that is close enough to provide support for the linear track element without unduly inhibiting the centering effect of the tracking means.

The enlarged cross-sectional detail view in FIG. 3 shows the track element bonded to the filter media itself and supported by the grid members 25 provided in each of the panel sections or suction chambers P of the filter drum 13. The further enlarged cross-sectional detail view of the linear track element shows more clearly the manner of bonding the same to the filter media or filter cloth whereby the flexible bonding substance F penetrates through the pores of the filter media or cloth to the opposite side thereof where it is fused together, thus securely locking itself to the cloth.

FIG. 3b is an enlarged cross-sectional detail view of a modified form or profile of the linear track element, with a stationary tracking member 26 or tracking roll engaging in the groove formed between and by two parallel ridges 27 and 28 of this linear track element.

The filter belt while passing from the discharge roll 17 downward to the idler roll 18 is subjected to washing treatment as indicated by the washing spray devices 27 and 28 within a trough structure 29 collecting the spent wash water for discharge through an outlet 30.

The aforementioned bowed bar 21 or its mechanical equivalent helps to keep the filter cloth wrinkle-free and furthermore provides a means to compensate or to correct a tendency of the linear track element together with the connected central portion of the filter media to creep or advance relative to the lateral portions of the filter media. That is to say, by suitable angular adjustment, the bulge is increased sufficiently to compensate for or to correct the forward creep. In this way, if a forward creep is being observed, it can be brought back to normal by such angular adjustment of the bowed bar.

Figure 4:
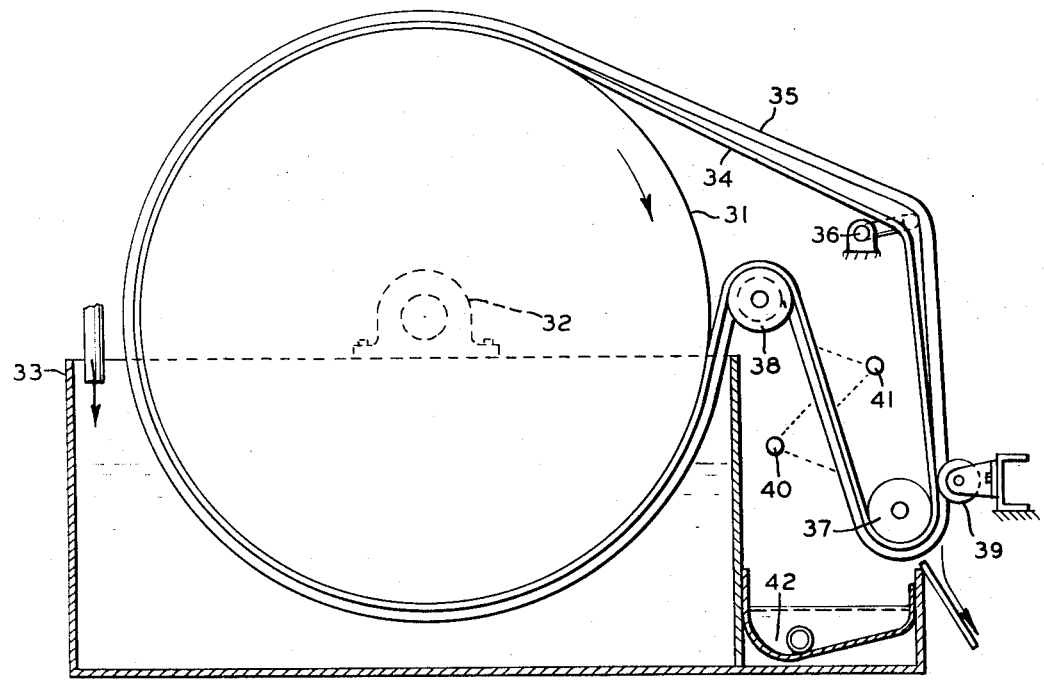
FIGURE 4 is a schematic side view of the filter unit illustrating another guide roll arrangement for the filter belt, including the bowed guide element.

FIG. 4 is a schematic version of the belt filter unit with a modified belt guide arrangement, embodying the tracking devices of this invention. In this instance, the filter drum 31 mounted on trunion bearings 32 on the slurry tank 33 pulls the filter belt 34 including the central linear track means 35 over a guide system which includes a bowed bar 36 or its mechanical equivalent, a cake discharge roll 37, and a tension roll 38. A tracking roller 39 engaging the linear track means in this example is located just a short distance from the cake discharge roll so that adequate backing is provided for the track element without unduly inhibiting a corrective lateral movement of the linear track element. However, other locations could be chosen for the mounting of this tracking roller with suitable backing means provided therefor. Again there are provided belt washing devices 40 and 41, spent wash water being collected in a trough 42.

Figure 5:
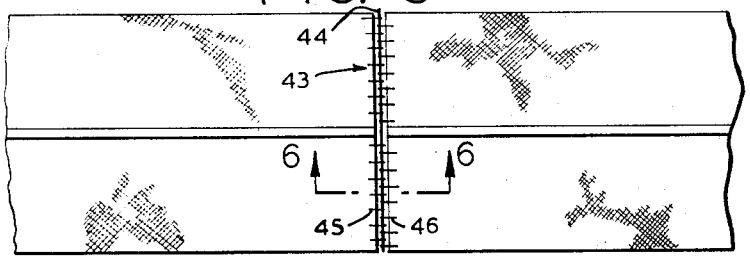
FIGURE 5 is a detail plan view of the filter belt per se, including belt end connections according to one form of the invention.
Figure 6:
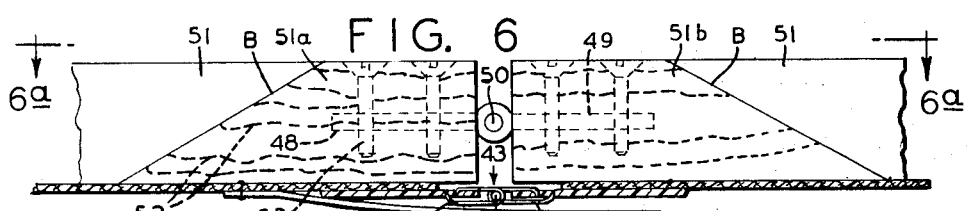
FIGURE 6 is a greatly enlarged sectional view taken on line 6—6 of FIGURE 5, showing details of the belt end connections.
Figure 6A:
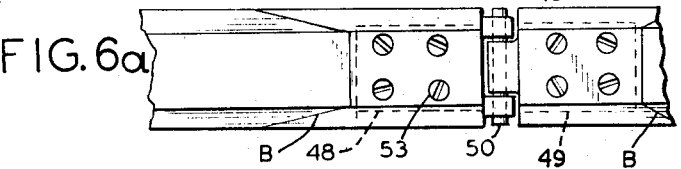
FIGURE 6a is a plain view taken on line 6a—6a of FIGURE 6.

According to the fragmentary detail plan view of the filter belt in FIG. 5, the two ends thereof are detachably connected to one another, that is to say (see FIG. 6) the transverse terminal edge portions of the filter media itself are interconnected by a clipper belt lacing connection 43 or its mechanical equivalent. As shown, this connection has a removable locking wire 44 connecting the two rows 45 and 46 of wire loops backed by a closure flap or strip 47, the ends of the linear track element are interconnected by means of hinge members 48 and 49 interconnected by a removable pin 50. In the example shown in FIG. 6 the track element comprises a main length 51 of deformable or stretchable rubber having a suitable cross-sectional profile, and terminal portions 51a and 51b of the same cross-sectional profile bonded to the ends of the main length on a bias plane B as shown, which terminal portions have molded into them suitable reinforcements 52 capable of firmly retaining the hinge elements with the aid of bolting screws 53.

In FIGURES 7 to 16 a linear track element 54 is fastened to the inner face of the filter media. The filter drum is therefore constructed to accommodate and guide this internal linear track element by way of a peripheral groove or recess 55 formed midway between the ends of the drum. This peripheral groove comprises a recess 56 (see FIG. 10) formed in each of the divider strips 57, which recesses are contoured to sealingly fit the track element. The supporting grids for the filter media in each panel section of the filter drum are in two sections 58 and 59, one at each side of the track element, and in between these grid sections there are rubber blocks 60 or the like (see FIGS. 8, 9, 11, 12) fastened or bonded to the drum body 61 for peripherally supporting the track element in the space between the divider strips.

In this embodiment, the guide system over which the filter belt must pass on its way from the filter drum back to the filter drum, is substantially similar to the one shown in FIG. 1, thus comprising the cake discharge roll 62, the idler roll 63, and the adjustable tension roll 64. Preferably, there is also provided the bowed bar device 65 adjustable about its horizontal axis, and imparting a transverse bulge to the filter belt. A detail view of this bowed bar in FIG. 13b shows that midway between the ends thereof there is provided a small rotatable sheave 65a (see also FIG. 13b) formed with a peripheral groove accommodating the internal track element. FIG. 13a is a detail view showing the end of the bowed bar with end-supporting means therefor indicating that the bowed bar is angularly adjustable about the horizontal axis.

FIG. 14 is an enlarged longitudinal sectional view of the cake discharge roll formed to accommodate the track element in a peripheral groove or recess located midway between the ends of the roll.

In FIG. 15 the internal track element 66 has opposite to it an external ridge element 67, both elements being bonded through the pores of the filter media to each other.

In FIG. 16 a modified track element 68 serves as a connection between a pair of lengths of filter media which extend edgewise adjacent and parallel to one another.

It will furthermore be understood that each of the elements, or two or more together, may also find a useful application in other types of travelling belt type filters differing from the type described above.

While the invention has been illustrated and described as embodied in a travelling belt filter with filter drum and guide roll system for the filter belt and cake discharge, it is not intended to be limited to the details shown, since various modifications and structural changes may be made without departing from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are to be intended to be comprehended within the meaning and range of equivalence of the following claims.

I claim:

1. A rotary vacuum drum filter apparatus of the travelling filter belt type, which comprises:
    a rotating horizontal filter drum;
    an endless travelling filter belt in the nature of a thin flexible porous endless filter web of a width approximately equal to that of the drum, said belt surrounding and engaging a major portion of the circumference of said drum so that the belt is moved by the rotation of the drum;
    a station adjacent to the drum for guiding said filter belt away from the upper portion of the drum to effect the discharge of cake material from the belt, and then back onto the lower portion of the drum where said cake material is collected on the filter belt from a slurry bath, said guide station comprising a cake discharge roller receiving the filter belt from the top portion of the drum, a return roller having a peripheral groove centrally intermediate its ends, delivering the belt to the underside of the drum; belt tracking devices which comprise a single flexible guide rib means secured to the outer side of the belt substantially medially and along substantially the entire length thereof and leaving the portions of the belt to either side of said guide rib means free to spread laterally, and having upstanding guide faces along the length thereof around the belt, and a guide element engaging said upstanding guide faces adjacent to said discharge roller at the belt receiving side thereof, at a point where said belt is substantially supported but not directly engaged by said roller, said guide element being effective to maintain the filter belt in centered relation to the drum while permitting spreading of the belt laterally in both directions, said guide rib means engaging said groove on the return roller, and tracking said belt back onto the drum; and an outwardly bowed member extending across the width of said belt at a position intermediate said drum and said guide element, and engaging the underside of the belt along a transverse bowed curve.

2. The filter apparatus according to claim 1, wherein said station comprises a third roller around which the belt is guided from the discharge roller to the return roller.

3. The filter apparatus according to claim 1, wherein said bowed member, said discharge roller, and said return roller are so located relative to each other and relative to the drum, that the belt is guided by said bowed member away from the top portion of the drum, and then at a relatively steep slope down to the discharge roller.

4. The filter apparatus according to claim 1, wherein said bowed member, said discharge roller, and said return roller are so located relative to each other and relative to the drum, that the belt is guided by said bowed member away from the top portion of the drum at a relatively shallow slope, then at a relatively steep slope downwardly around to the discharge roller and around the same directly to said return roller.

5. The filter apparatus according to claim 1, wherein said guide rib means comprises a single rib, and said guide element is a grooved roller engaging said rib.

6. The filter apparatus according to claim 1, wherein said guide rib means comprises a pair of ribs, and said guide element engages the groove formed by and between said pair of ribs.

7. The filter apparatus according to claim 1, wherein said rib means is provided with fastening means penetrating through the filter belt material, whereby said rib means are connected to the belt material along the length thereof.

8. The filter apparatus according to claim 7, wherein said fastening means comprise a bonding substance penetrating through the porous belt material, thereby connecting the base of said rib means to said material.

References Cited

UNITED STATES PATENTS

| | | | |
|---|---|---|---|
| 207,626 | 9/1878 | Sargent | 198—202 X |
| 2,863,555 | 12/1958 | Jaritz | 198—202 X |
| 3,096,279 | 7/1963 | Komline | 210—401 X |
| 3,134,703 | 5/1964 | Lisner | 156—157 |
| 3,227,281 | 1/1966 | Peterson et al. | 210—401 X |
| 3,289,848 | 12/1966 | Miles | 210—401 X |

SAMIH N. ZAHARNA, *Primary Examiner.*